(12) United States Patent
Kinn et al.

(10) Patent No.: US 7,329,623 B2
(45) Date of Patent: Feb. 12, 2008

(54) DURABLE HYDROPHILIC NONWOVEN MAT

(75) Inventors: Larry L. Kinn, Franklin, MA (US); Ashish Mathur, Wilmington, DE (US); Gregory Neil Henning, Charlotte, NC (US)

(73) Assignee: Ahlstrom Mount Holly Springs LLC, Mount Holly Springs, PA (US)

( * ) Notice: Subject to any disclaimer, the term of this patent is extended or adjusted under 35 U.S.C. 154(b) by 726 days.

(21) Appl. No.: 10/232,480

(22) Filed: Aug. 30, 2002

(65) Prior Publication Data

US 2003/0087568 A1 May 8, 2003

Related U.S. Application Data

(62) Division of application No. 09/479,694, filed on Jan. 7, 2000, now Pat. No. 6,444,367.

(60) Provisional application No. 60/115,172, filed on Jan. 8, 1999.

(51) Int. Cl.
*D04H 5/00* (2006.01)
*D04H 1/54* (2006.01)
*D04H 3/16* (2006.01)
*B32B 25/02* (2006.01)
*D02G 1/20* (2006.01)

(52) U.S. Cl. .............. 442/414; 442/361; 442/364; 442/400; 442/401; 442/411; 264/103; 28/103; 28/104

(58) Field of Classification Search .......... 442/361, 442/382, 362, 363, 364, 400, 401, 414; 428/364, 428/394, 373, 374, 296.7, 299.7; 429/250; 264/103; 28/103, 104
See application file for complete search history.

(56) References Cited

U.S. PATENT DOCUMENTS

| | | | |
|---|---|---|---|
| 3,811,957 A | 5/1974 | Buntin | 136/146 |
| 3,847,676 A | 11/1974 | Palmer et al. | 136/148 |
| 3,870,567 A | 3/1975 | Palmer et al. | 136/148 |
| 3,918,995 A | 11/1975 | Palmer et al. | 136/145 |
| 3,928,067 A | 12/1975 | Broadhead et al. | 136/6 |
| 3,933,525 A | 1/1976 | Palmer et al. | 136/146 |
| 3,947,537 A | 3/1976 | Buntin et al. | 264/137 |
| 3,972,759 A | 8/1976 | Buntin | 156/167 |
| 4,165,352 A | 8/1979 | Volkman | 264/113 |
| 4,438,185 A | 3/1984 | Taskier | 429/250 |
| 4,578,414 A | 3/1986 | Sawyer et al. | 524/310 |
| 5,120,888 A | 6/1992 | Nohr et al. | 524/99 |
| 5,389,471 A | 2/1995 | Kung | 429/206 |
| 5,439,734 A | 8/1995 | Everhart et al. | 428/224 |
| 5,456,982 A | 10/1995 | Hansen et al. | 428/370 |
| 5,492,781 A | 2/1996 | Degen et al. | 429/144 |
| 5,582,904 A * | 12/1996 | Harrington | 239/432 |
| 5,614,574 A | 3/1997 | Sheth | 524/140 |
| 5,962,161 A | 10/1999 | Zucker | 429/142 |
| 5,969,026 A | 10/1999 | Mor et al. | 524/317 |
| 6,120,939 A | 9/2000 | Whear et al. | 429/254 |
| 6,146,757 A | 11/2000 | Mor et al. | 428/364 |
| 6,696,373 B2 * | 2/2004 | Kinn et al. | 442/361 |

FOREIGN PATENT DOCUMENTS

| | | |
|---|---|---|
| EP | 0597 224 A2 | 9/1993 |
| EP | 0438 114 B1 | 4/1995 |
| EP | 0450 449 B1 | 8/1995 |
| EP | 0683 260 A2 | 11/1995 |
| EP | 0710 994 A2 | 5/1996 |
| EP | 0591 616 B1 | 9/1996 |
| EP | 0756 340 A1 | 1/1997 |
| EP | 0795 916 A1 | 9/1997 |
| EP | 0834 938 A2 | 4/1998 |
| EP | 0680 107 B1 | 7/1998 |
| FR | 2712 612 B1 | 5/1995 |
| JP | 60-194113 | 10/1985 |
| JP | 62-268900 | 11/1987 |
| JP | 05272006 | 10/1993 |
| JP | 05272013 | 10/1993 |
| JP | 05283053 | 10/1993 |
| JP | 07006746 | 1/1995 |
| JP | 07192714 | 7/1995 |
| JP | 07192715 | 7/1995 |
| JP | 08311717 | 11/1996 |
| JP | 10008367 | 1/1998 |
| JP | 11-293564 | 10/1999 |
| WO | WO 98/23809 | 6/1998 |
| WO | WO 98/27263 | 6/1998 |
| WO | WO 98/28477 | 7/1998 |
| WO | WO 98/31060 | 7/1998 |
| WO | WO 98/35829 | 8/1998 |
| WO | WO 98/00447 | 1/1999 |

* cited by examiner

*Primary Examiner*—Terrel Morris
*Assistant Examiner*—Lynda M. Salvatore
(74) *Attorney, Agent, or Firm*—Ostrager Chong Flaherty & Broitman PC

(57) ABSTRACT

A nonwoven web of a wettable fiber matrix, wherein the wettable fiber matrix are thermoplastic polymeric fibers blended with at least one hydrophilic melt additive. In alternate embodiments, the nonwoven web further includes binder fibers which may be wettable or non-wettable or combinations of both.

25 Claims, No Drawings

DURABLE HYDROPHILIC NONWOVEN MAT

RELATED APPLICATION

This application claims the benefit of U.S. Provisional Application No. 60/115,172 filed Jan. 8, 1999, which is incorporated in its entirety herein by reference. This application is a divisional application of U.S. patent application Ser. No. 09/479,694 filed Jan. 7, 2000, now U.S. Pat. No. 6,444,367.

FIELD OF THE INVENTION

The present invention relates to battery separator materials. More particularly, the invention is directed to nonwoven webs made of a wettable fiber matrix and non-wettable binder fibers for use in rechargeable alkaline batteries.

BACKGROUND OF THE INVENTION

Rechargeable alkaline batteries typically require separators to function primarily as dielectric as well as electrolyte reservoirs. In addition to being inert to 31% potassium hydroxide (KOH) used as the electrolyte, separator materials should possess durable wettability to withstand the rigors during the discharging and recharging of the battery. Typical separator constructions employ nonwoven structures comprising either nylon or polyolefin fibers.

Representative examples of such constructions are illustrated in the following patents.

U.S. Pat. No. 5,389,471 to Kung discloses a separator for an alkaline battery comprised of a porous sheet of a microporous film, fabric or synthetic paper which sheet is saturated with a resin containing one or more carboxyl groups neutralized with a base so as to form a salt. The resin includes a high molecular weight acrylic acid having one or more carboxyl groups. A particularly preferred resin disclosed in the examples is Carbopol (a high molecular weight acrylic acid homopolymer).

U.S. Pat. No. 5,439,734 to Everhart discloses a nonwoven fabric formed from polyolefin blended with at least one di-fatty acid ester hydrophilic additive. The additives in Everhart include a dioleate ester of polyethylene oxide, ethoxylated ester of caster oil, a blend of glycerol monooleate ester and ethoxylated nonylphenol and Maypeg—400 ml monolaurate.

Palmer U.S. Pat. No. 3,847,676 teaches a battery separator made of a non woven mat of fibers of polymeric resin, i.e., C2–C8 polyolefin thermoplastic such as polyethylene, polypropylene and polystyrene containing a first wetting agent dispersed therein (relatively water insoluble), the fibers having a coating on their outer surfaces of a second wetting agent. The internally dispersed wetting agents are surfactants and preferably C8 to C18 phenol surfactants having 1–15 moles of ethylene oxide. The second wetting agent which is coated on the exterior of the fibers is relatively water soluble and relatively oil insoluble and is preferably an anionic and/or nonionic surfactant.

Palmer U.S. Pat. No. 3,870,567 deals with battery separators formed from nonwoven thermoplastic fiber mats, the fibers containing an internal wetting agent that will bloom over a period of time at ambient temperatures of the battery. Nonylphenol ethylene oxide is an example of a suitable wetting agent.

Palmer U.S. Pat. No. 3,918,995 also involves a battery separator produced from a nonwoven mat of plastic fibers having an internal surfactant and a second surfactant coated on the exterior of the fibers. This patent is a division of Palmer U.S. Pat. No. 3,847,676, the claims in the '995 patent being drawn to a battery as contrasted with a separator.

Palmer U.S. Pat. No. 3,933,525 discloses nonwoven battery separators comprised of polyolefin fibers having internal wetting agents, preferably comprised of two surfactants. The preferred surfactants are C8 and C18 phenol surfactants having 1–15 moles of ethylene dioxide.

Broadhead U.S. Pat. No. 3,928,067 discloses polypropylene separators for use in lithium non aqueous secondary batteries which include as wetting agents for the polypropylene separators polyalkylene glycol esters, tetraalkylammonium halides and certain lithium salts and preferably combinations of certain polyalkylene glycol ethers and tetralkyl-ammonium halides.

Bunton U.S. Pat. No. 3,947,537 discloses battery separators made from nonwoven mats of thermoplastic fibers which have been wetted with a surfactant water mixture of an anionic surfactant such as an aliphatic sulfate or a non-ionic surfactant such as a polyethylene oxy compound.

EP 0 450 449 B1 is directed to separator materials for storage batteries comprising a fabric sheet made of sulfonated conjugate fibers comprising at least first and second components thermally bonded together, the first component being a surface layer, the second component occupying a core portion, the first component being an ethylene copolymer containing at least a unit having the formula —$CH_2$—$C(SO_3H)$ $(COOH)$— and comprising an ethylene carbonic acid monomer containing acrylic and/or nucleic acid and possibly also an acrylic acid ester, the second component comprising a non-sulfonated polyolefin.

EP 0 591 616 B1 is directed to a hydrophilized separator material of a nonwoven composed of a mixture of polyamide and/or polyolefin fibers of different softening ranges, characterized in that the separator material is moistened with deionized water before its use.

EP 0 680 107 B1 is concerned with a nickel-hydrogen secondary battery including a separator formed of a sheet material containing polyolefin based synthetic resin fibers having a first surface which is hydrophilic and a second surface having a hydrophilic portion and a hydrophobic portion. The polyolefin fibers are core-sheath type composite fibers comprising a core of polyolefin and a sheath of another polyolefin.

EP 0 710 994 A2 relates to a battery separator comprising (1) a nonwoven web of fibers having a mean diameter of about 15 μm or less and (2) a graft polymerized monomer on the surface of the nonwoven web which renders the nonwoven web wettable.

EP 0 756 340 A1 is directed to a battery separator comprising a nonwoven web of first and second fibers, the first fibers corresponding to a first and second polyolefin, the second fibers comprising a third polyolefin, treated so that the separator preferably formed of two such nonwoven webs, is spontaneously wettable by an electrolyte.

EP 0 795 916 A1 relates to a wet-laid nonwoven fabric formed from three dimensional entanglement of thermoplastic staple fibers with hot melt fibers suitable for use as a battery separator. The resultant nonwoven fabric can be subjected to a hydrophilic treatment with a "generally used surfactant, a sulphonation treatment, a fluorination treatment, a plasma treatment or a corona discharge treatment.

EP 0 834 938 A2 discloses an alkaline battery separator formed by heat fusion and hydroentangling 1) polyolefin dividable composite fibers 2) high strength composite fibers (polypropylene) and 3) polyolefin heat sensitive adhesive fibers, all as more specifically defined. This application also teaches treatment of the resultant fabric for imparting a hydrophilic property by employing a sulphonating treatment, a treatment with fluorine gas, a graft polymerization treatment with vinyl monomers, a treatment with a surface active agent, a treatment used to adhere hydrophilic resins, a discharging treatment, or the like. As surface active agents there are disclosed anionic surface active agents (alkali metal salt of a higher fatty acid, alkyl sulfonate, or a salt of sulfosuccinate).

WO98/31060 discloses a battery separator useful in batteries of the recombinant or sealed type made from extremely fine meltblown fibers self-bonded in a cohesive, uncompressive mass. This fiber mat is made wettable by battery acid by addition of a surface active agent to the polymer prior to extrusion or by covalently bonding hydrophilic groups to the surface of the fibers after formation. Suitable additives are polytetrahydrafuran, mono & diglycerides from fatty acids & dimethylsilicone oxyalkylene copolymer.

WO99/00447 discloses a product and process for making wettable fibers prepared from an olefin polymer, polyester or polyamide including a wetting agent consisting essentially of a monoglyceride or a combination of a monoglyceride and a mixed glyceride with the monoglyceride amounting to at least 85% by weight in the case of the combination.

The monoglyceride corresponds to the formula

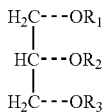

wherein —$OR_1$, $OR_2$, and —$OR_3$ are hydroxyl or a fatty acid ester group, but only one of them is a fatty acid ester group ($C_{12-22}$) The mixed glyceride (di- or tri-) corresponds to the formula

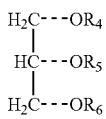

wherein —$OR_4$, $OR_5$, and —$OR_6$ are hydroxyl or a fatty acid ester group ($C_{12-22}$). The combination of this di- or triglyceride with the monoglyceride constitutes the wetting agent in accordance with one embodiment.

As is shown in the prior art both nylon and polyolefins have inherent property limitations, which lead to shorter battery life. While nylon is susceptible to alkaline degradation, polyolefins, though being chemically inert, are hydrophobic in nature.

It is known in the art to convert polypropylene fiber, which is hydrophobic, into a hydrophilic fiber by chemically modifying its surface. However, topical chemical applications are not entirely satisfactory as they are not durable, and other types of surface modifications may need extra processing steps and tend to be expensive. In addition, some of these modifications age with time, especially in the presence of 31% potassium hydroxide (KOH) electrolyte solution used in alkaline batteries. The few processes known to render the polyolefins wettable are environmentally unfriendly, very slow processes and are not durable enough.

An alternative and improvement over chemical modification is to directly melt blend a hydrophilic additive into the polypropylene or thermoplastic polymer rendering the fibers themselves hydrophilic. The invention solves the forgoing problems and provides such a product by incorporating one or more hydrophilic melt additives into polyolefin resin (polypropylene (PP) or polyethylene (PE) or bicomponent) fibers to produce nonwoven constructions for use as battery separators. The hydrophilic melt additives are incorporated into PP polymer fiber which is then converted into nonwoven separator materials by wet laid and carding/thermal bonding processes. Alternatively, the PP polymer and additives may be converted directly from the polymer into nonwoven form by spunbonding or meltblowing, or a combination of the two.

The preferred melt additives are an admixture of hydroxy phenols and polyethylene glycols. The hydroxy phenol is characterized in that it contains the functional group $HOC_6H_4$—. According to the preferred embodiments of the invention, the nonwoven battery separator is fabricated employing wet laid and carded thermal bonding processes. An advantage of the invention is obtained by use of combinations of hydrophobic and hydrophilic fibers in the battery separator fabric, i.e., all fibers in the separator need not be permanently wettable. In the preferred embodiment, the separator includes bicomponent fibers in which the melt additive is incorporated into the sheath constituent(s) of the fiber. Use of bicomponent fibers, as well as combinations of hydrophobic and hydrophilic fibers, reduces costs and permits optimization of the separator for diverse applications.

A broad aspect of the invention is to provide a nonwoven web that is durable and has the wettability and strength for use in rechargeable alkaline batteries by directly incorporating melt additives into the polymeric component during melt processing to form a wettable fiber matrix. This fiber matrix can be meltblown, spunbonded or made into staple fibers to form a 100% wettable web. Alternatively the wettable fiber matrix can be mixed with binder fibers that are wettable or non-wettable or mixtures of both which are then made into a nonwoven web.

An object of the invention is to provide a nonwoven web with increased wettability and strength for use as battery separator material.

Another broad object of the invention is to provide a nonwoven that is durable and wettable in harsh environments.

A further object of the invention is to provide a nonwoven web that has both hydrophilic and hydrophobic regions.

Another further object of the invention is to provide a method for producing products that can be designed to have varied wettablility and strength properties depending on the desired end use applications.

A specific object of the invention is to provide a lower cost battery separator material including bicomponent fibers, wherein melt additives are incorporated in the fiber sheath of the bicomponent fiber and not the core.

Another specific object of the invention is to provide an economical battery separator material made of both wettable and non-wettable polymeric fibers.

A more specific object of the invention is to provide a nonwoven web that can be used for other applications such as diapers and feminine care products, and medical applications which would require durable wettability.

Another object of the invention is to provide a nonwoven web that can be used in clothing applications, wherein products produced remain durable and hydrophilic after multiple machine washings.

Another object of the invention is to provide a nonwoven that can be used in filtration applications, wherein durable and wettable properties are required.

SUMMARY OF THE INVENTION

In the present invention, these purposes, as well as others which will be apparent, are achieved generally by providing a battery separator material comprising a nonwoven web of a wettable fiber matrix, wherein the wettable fiber matrix are thermoplastic polymeric fibers blended with a hydrophilic melt additive. The fiber matrix furnish can be meltblown, spunbonded or made into staple fibers to form a nonwoven web that is 100% wettable.

The thermoplastic polymeric fibers are preferrably either polypropylene staple fibers or polypropylene/polypropylene bicomponent fibers having a polypropylene sheath and a polypropylene core.

The hydrophilic melt additives are a mixture of at least one or more hydroxy phenols and polyethylene glycols.

In another embodiment the wettable fiber matrix is blended with non-wettable binder fibers. Preferably these binder fibers are polyethylene/polypropylene bicomponent fibers having a polyethylene sheath and a polypropylene core.

In another embodiment of the invention the nonwoven web further includes wettable binder fibers. The wettable binder fibers are preferably polyethylene/polypropylene bicomponent fibers blended with a hydrophilic melt additive. Where the hydrophilic melt additive is incorporated into the polyethylene sheath of the bicomponent fiber.

In a preferred embodiment the nonwoven web is 30–90 wt. % of the wettable fiber matrix; and 10–70 wt. % of the non-wettable binder fibers. In a more preferred embodiment the nonwoven web is 50% wettable fiber matrix and 50% non-wettable binder fibers.

In another preferred embodiment the nonwoven web is up to 40 wt. % of the wettable fiber matrix; up to 40 wt. % of the non-wettable binder fibers; and up to 30 wt. % of the wettable binder fibers. Although preferred ranges are described, any combination of wettable fiber matrix, non-wettable binder fibers and wettable binder fibers are encompassed by the invention with the amounts of each component depending on the desired wettability and strength properties of the resulting web.

In general the battery separator materials of the invention have enhanced wettability and strength and provide good permeability to gases.

The invention also includes the related process for making nonwoven webs which can be used as battery separators and in other applications which require durability and wettability. In general a fiber furnish comprising wettable thermoplastic polymeric fibers blended with at least one hydrophilic melt additive is formed into a nonwoven web by meltblowing, spunbonding or made into staple fibers. In a preferred embodiment the furnish is further mixed with binder fibers which are then laid on a papermaking machine to form a wet-laid web. The water is removed from the wet-laid web, thermal bonded and calendered to form the nonwoven.

The nonwoven mats produced, in addition to use as battery separators, can be used in other applications such as absorbent and hygiene products, medical products, clothing and filtration products which require durable wettability and strength.

Other objects, features and advantages of the present invention will become apparent from the following detailed description of the best mode of practicing the invention as follows:

DETAILED DESCRIPTION OF THE INVENTION

In general, a battery separator material comprising a nonwoven web of a wettable fiber matrix made of thermoplastic polymeric fibers blended with at least one hydrophilic melt additives.

The hydrophilic melt additives are incorporated into the thermoplastic polymer and subsequently converted into fiber form and later into a nonwoven using any of the various forming technologies. Alternatively the material can be converted directly from the polymer into a nonwoven by spunbonding, meltblowing or a combination of the two. By combining the melt additives and the nonwoven process, a permanently wettable battery separator is produced and is able to withstand up to 31% KOH and prolong the lifetime of NiCd and NiMH rechargeable alkaline batteries.

In an embodiment of the invention the hydrophilic melt additives are blended with a polypropylene staple fibers to form a wettable fiber matrix. This matrix is then further combined with non-wettable binder fibers and wet-laid to form the nonwoven material of the invention. The non-wettable binder fibers used include a bicomponent fiber comprising a polyethylene sheath and a polypropylene core, commercially available as Chisso fibers from Chisso, Japan. The nonwoven material formed has both discrete hydrophobic and hydrophilic regions due to the different types of fibers used in making the web.

In an alternate embodiment the hydrophilic melt additives are blended with bicomponent fibers comprising a polypropylene sheath and a polypropylene core to form the wettable fiber matrix. The bicomponent sheath/core fiber proportions used in the invention vary from 50/50 sheath/core to 60/40 sheath/core. Essentially the melt additives are incorporated into the outer polypropylene sheath of the fibers. Use of bicomponent fibers having 60/40 sheath/core permit higher incorporation of the melt additive into the sheath portion. The wettable fiber matrix formed is then further combined with non-wettable binder fibers to form the nonwoven web.

In all embodiments, the durable hydrophilic mat is manufactured by blending a concentrate of hydrophilic melt additives with the thermoplastic polymer and converting the polymer into a nonwoven form directly or through an intermediate fiber formation process. The chemistry and physical properties of the additives, its compatibility with the thermoplastic resin, as well as the process conditions and constructional features of the nonwoven separator are necessary to yield the desired performance. The type of melt additive and proportion are important to the durable wettability of the nonwoven fabric.

In general the melt additives used in the invention are an admixture of hydroxy phenols and polyethylene glycols. Examples of melt additives used are commercially available from Techmer PM, California under the product designations PPM 11211, PPM 11249, PPM 11212, PPM 11267 and PPM 11268. The technical brochures of each of these materials are incorporated herein by reference.

A variety of different melt additive formulations can be used to form the wettable fiber matrix. Specific formulations are illustrated in Examples 1 to 5 herein. In general, the formulas include an active chemical which is an admixture of hydroxy phenols and polyethylene glycols. This active or functional chemical is provided in a carrier resin, preferably polypropylene, of a given melt flow rate (MFR) suitable for meltblowing, spunbonding or staple fiber manufacture. Accordingly, the formulations have different melt flow rates depending on the end use applications. The MFR listed in the formulations below were measured at 230° C., 2.16 kg. Melt blown grade polpropylene resins typically have a much higher melt flow rate (MFR 800–1200), whereas spunbond and staple fiber grade polypropylene resins have a lower melt flow rate (MFR 7–35). The base chemicals in the formulations include durable hydrophilic materials or non-durable hydrophilic materials depending on the desired wettability properties and end use applications.

The non-durable hydrophilic materials provide initial wetting of the fibers to enhance and maximize incorporation of the durable hydrophilic materials. The durable hydrophilic materials impart the wettability and strength properties to the fiber materials. In particular, in battery separator applications, the more durable chemical loaded, absorbency and wicking increase and the longer the life of the battery.

Melt Additive formulations 1 to 5 are illustrative of the types of melt additive formulations used in the invention and shown in Examples 1 to 5.

Melt Additive 1 contains approximately 30% of the active chemical and includes the same durable hydrophilic materials as in Melt Additive formulation 4 but a different melt flow rate. This additive is commercially available as PPM 11211 from Techmer PM, California.

Melt Additive 2 contains approximately 30% of the active chemical and includes the same non-durable hydrophilic materials as in Melt Additive formulation 5 but a different melt flow rate. This additive is commercially available as PPM 11212 from Techmer PM, California.

Melt Additive 3 contains approximately 20% of the active chemical and includes non-durable hydrophilic materials. This additive is commercially available as PPM 11249 from Techmer PM, California.

Melt Additive 4 contains approximately 25% of the active chemical and includes the same durable hydrophilic materials as in Melt Additive formulation 1. This additive has a MFR of 54 grams/10 minutes and is commercially available as PPM 11267 from Techmer PM, California.

Melt Additive 5 contains approximately 20% of the active chemical and includes the same non-durable hydrophilic materials as in Melt Additive formulation 2. This additive has a MFR of 109 grams/10 minutes and is commercially available as PPM 11268 from Techmer PM, California.

For melt blown nonwoven structures, in preferred applications, Melt Additive formulations 1, 2 and 3 are used. Preferred proportions for melt blown structures include use of 15–35% of Melt Additive 1 formulation, i.e., 4–10% of the active chemical or up to 10% of Melt Additive 2 formulation, i.e., up to 3% of the active chemical. Most preferred proportions for melt blown structures include 30% of Melt Additive formulation 1, i.e. 9% of the active chemical and 5% of Melt Additive 2 formulation, i.e. 1.5% of the active chemical.

For spunbond and nonwoven mats containing staple fibers, in preferred applications, Melt Additive formulations 4 and 5 are used. Preferred proportions for such structures include use of 15–30% of Melt Additive 4 formulation, i.e., 4–8% of the active chemical or up to 10% of Melt Additive 5 formulation, i.e., up to 2% of the active chemical. Most preferred proportions for these structures include 25% of Melt Additive formulation 4, i.e. 6% of the active chemical and 5% of Melt Additive 5 formulation, i.e. 1% of the active chemical.

The hydrophilic melt additives can be used in the following preferred forms of nonwovens, namely meltblown, spunbond, SMS (spunbond/meltblown/spunbond), wet-laid, dry-laid or a combination of these forms. While meltblown, spunbond and SMS nonwoven structures consist of 100% polypropylene fibers, dry-laid and wet-laid nonwovens comprise polypropylene, polyethylene or polypropylene/polyethylene bicomponent fibers in various proportions where the polyethylene components may or may not contain the hydrophilic melt additive.

Fiber deniers for melt blown structures typically range from 0.1 to 2.0 deniers, with less than 1.0 most preferred. In the case of staple fiber and spunbond filaments deniers, fiber deniers of less than 3.0 are used, but less than 2.0 are most preferred.

Although it is preferred that the nonwoven mat of the invention is a single-ply layer other multi-ply structures are possible.

For spunbond and staple fiber nonwoven structures, in preferred applications Melt Additive formulations 4 and 5 are used.

To understand the present invention more fully, the following examples of the invention are described below. These examples are for purposes of illustration only and this invention should not be considered to be limited by any recitation used therein. The examples demonstrate the preparation of various battery separator materials in accordance with the process of the invention.

As in the examples below, unless otherwise specified, the test procedures for testing electrolyte initial wet out time, retention (absorbency %) and wicking in battery separator fabric are as follows:

Preparation of 31% KOH solution: Ingredients: Distilled water and potassium hydroxide pellets (KOH). Procedure: The distilled water is freed of dissolved carbon dioxide by boiling and covering with a watch glass. The boiled water is allowed to cool to room temperature. The solution should be 31% KOH by weight. Since solid KOH contains approximately 10% water, 34.5 g of solid KOH is used for every 100 g of solution required. The solution is made by slowly adding the 34.5 g of KOH to 65.5 g of water.

Wet Out Time 10 ml of 31% potassium hydroxide (KOH) was placed in a five inch watch glass. One 5/8" diameter disc sample was placed on the surface of the KOH. The time in seconds was recorded for initial wet out time up to 120 secs. These measurements were taken of the sample "as is" (WET OUT BEFORE) and of the sample after 7 days aging in the 31% KOH (WET OUT AFTER). The average time in seconds was reported for the samples. In some examples, the samples were only aged for 5 days.

Electrolyte Retentively (Absorbency %)

Retentively refers to the amount of potassium hydroxide solution that will be retained by a specimen. Values are obtained by determining the amount of solution of KOH that is retained by a specimen soaked in the solution.

Specifically, three (3) specimens from each sample are cut (such that the "V" shaped portion of the die runs in the MD direction). The specimens are conditioned by drying in an oven at 70° C. (158° F.) for 1 minute, removed from the oven, and conditioned to the lab environment for 15 minutes prior to testing.

Each specimen of the fabric is weighed ("dry weight") and then is soaked in a 31% solution of KOH. The amount of solution retained by the specimen is measured after 1 hour. The specimen was removed, allowed to drip for 10 minutes, and weighed and recorded as "wet weight". The percent retention was calculated using the following formula:

$$\frac{(\text{Wet weight} - \text{Dry weight})}{(\text{Dry weight})} \times 100 = \% \text{ Retention}$$

Electrolyte Absorbing (Wicking)

Wicking refers to the ability of a fabric to absorb a liquid through capillary action. Wicking values are obtained by determining the distance a solution of potassium hydroxide (KOH) is absorbed (wick) by a fabric specimen held vertically.

Specifically, three (3) specimens from each sample are cut 1" CD×7" MD. The specimens are conditioned by drying in an oven at 70° C. (158° F.) for 1 minute, removed from the oven, and conditioned to the lab environment for 15 minutes prior to testing. Each specimen of the fabric was suspended vertically in a 31% solution of KOH and the distance the liquid is absorbed by the specimen is measured after 30 minutes.

Alkali Proof Character

A pre-weighed specimen of the fabric is soaked in a 31% solution of potassium hydroxide (KOH) for 7 days at a temperature of 70° C. (158° F.) and then re-weighed to determine weight loss. This method is used to determine the effects on the fabric when subjected to a long term exposure in a solution of KOH, at an elevated temperature.

Specifically, three (3) specimens from each sample are cut 2" CD×8" MD. The specimens are conditioned by drying in an oven at 70° C. (158° F.) for 1 minute, removed from the oven, and conditioned to the lab environment for 15 minutes prior to testing. Each specimen of the fabric was weighed and then submerged in the KOH solution and soake for 7 days. After 7 days the samples were removed and rinsed thoroughly with distilled water to remove all the KOH solution (6 or 7 times in a beaker with distilled water). The specimens were dried and re-weighed to determine weight loss.

EXAMPLE 1

A wettable battery separator material was prepared from a mixture of a wettable fiber matrix and non-wettable binder fibers.

The wettable fiber matrix comprised a polypropylene staple fiber containing combinations of Melt Additive formulations 4 and 5. The polypropylene staple fibers are 1.8 denier×12 mm and are commercially available from American Extrusion.

The non-wettable binder fibers comprised a bicomponent fiber having a polyethylene sheath and a polypropylene core. The binder fibers are 2.0 denier×5 mm and are commercially available as Chisso fibers from Chisso, Japan.

The wettable fiber matrix was mixed with varying amounts of the non-wettable binder fibers, samples 1 to 4. The total weight of the handsheets are indicated next to each sample.

Sample 1—50% Wettable fiber matrix; and 50% Non-wettable binder fiber (30 gsm)

Sample 2—50% Wettable fiber matrix; and 50% Non-wettable binder fiber (50 gsm)

Sample 3—60% Wettable fiber matrix; and 40% Non-wettable binder fiber (50 gsm)

Sample 4—70% Wettable fiber matrix; and 30% Non-wettable binder fiber (50 gsm)

Each fiber furnish mixture was dispersed and wet-laid into handsheets which were evaluated before and after calendering for wettability performance. The substrates were tested for absorbency, wicking and wet-out to KOH. The tests were also done after 7 days exposure to KOH at 70° F. The results are summarized in Tables I & II below.

TABLE I

| SAMPLE | BASIS WT. gsy | THICKNESS mils | TENSILES MD | TENSILES CD | ELONG. MD | ELONG. CD | AIR PERMEABILITY cfm |
|---|---|---|---|---|---|---|---|
| | | | lbs/in | | % | | |
| 1 UNC | 28 | 9.7 | 2 | 1 | 8 | 7 | 750 |
| 1 CAL | 27 | 4.5 | 1.8 | 1.6 | 6 | 14 | 325 |
| 2 UNC | 45.3 | 14.8 | 4 | 4 | 7 | 6 | 538 |
| 2 CAL | 45.5 | 5.4 | 5.8 | 7.3 | 13 | 14 | 293 |
| 3 UNC | 43 | 13.5 | 3 | 2.3 | 7 | 5 | 588 |
| 3 CAL | 47 | 6 | 6 | 5.8 | 13 | 11 | 101 |
| 4 UNC | 41 | 14 | 2 | 1.7 | 4 | 5 | 631 |
| 4 CAL | 47.5 | 6 | 3.6 | 3.6 | 5 | 7 | 99 |

UNC - uncalendered;
CAL - calendered

Table I illustrates the effect of calendaring on the nonwoven web. Calendering increases the fiber tie down of the nonwovens, specifically, it is shown that the thickness of the webs decrease after calendering. Further as seen in the increase in tensile values in Table I, calendering maximizes the strength of the nonwovens.

TABLE II

| | WETTABILITY BEFORE AND AFTER AGING | | | | | |
|---|---|---|---|---|---|---|
| | BEFORE | | | AFTER | | |
| SAMPLE | ABSORB % | WICKING cm/ 10 min | WET-OUT sec | ABSORB % | WICKING cm/ 10 min | WET OUT sec | WT. LOSS % |
| 1 UNC | 801 | 1.0 | I | 674 | 1.2 | 3 | 2.7 |
| 1 CAL | 350 | 4.5 | I | 349 | 1.3 | I | 1.9 |
| 2 UNC | 770 | 1.3 | I | 790 | 1.6 | 1.7 | 0 |
| 2 CAL | 192 | 6.2 | I | 208 | 2.5 | I | 0 |

TABLE II-continued

WETTABILITY BEFORE AND AFTER AGING

| | BEFORE | | | AFTER | | |
|---|---|---|---|---|---|---|
| SAMPLE | ABSORB % | WICKING cm/ 10 min | WET-OUT sec | ABSORB % | WICKING cm/ 10 min | WET OUT sec | WT. LOSS % |
| 3 UNC | 592 | 1.3 | I | 778 | 1.7 | 3.1 | 0.7 |
| 3 CAL | 242 | 6.7 | I | 255 | 7.3 | I | 1.1 |
| 4 UNC | 831 | 1.4 | I | 815 | 1.7 | 3.6 | 0 |
| 4 CAL | 230 | 6.3 | I | 236 | 6.3 | I | 0 |

UNC - uncalendered;
CAL - calendered;
I - immediate

For battery separator applications, target measurements for wettability are absorbency greater than 200%, wicking greater than 3.0 cm/10 min and wet-out of less than 2 minutes. In general, all the samples tested meet these targets. The aging data in Table II demonstrated that the nonwovens formed were durable and wettable. Further, the absorbency values after calendering indicated that the nonwovens were acceptable for use as battery separator materials.

EXAMPLE 2

A wettable battery separator material was prepared from a mixture of a wettable fiber matrix and non-wettable binder fibers.

The wettable fiber matrix comprised a polypropylene staple fiber containing combinations of Melt Additive formulations 4 and 5. The polypropylene staple fibers are 1.8 denier×12 mm and are commercially available from American Extrusion.

The non-wettable binder fibers comprised a bicomponent fiber having a polyethylene sheath and a polypropylene core. The binder fibers are 2.0 denier×5 mm and are commercially available as Chisso fibers from Chisso, Japan.

50% of the wettable fiber matrix was mixed with 50% of the non-wettable binder fibers. The fiber furnish mixture was dispersed and wet-laid into handsheets having a caliper of 6 mil and 7 mil, Samples 5 and 6 respectively. The substrates were evaluated after calendering for absorbency, wicking and wet-out to KOH. The tests were also done after 7 days exposure to KOH at 70° F. The results are summarized in Tables III & IV below.

TABLE III

| SAMPLE | BASIS WT. gsy | THICKNESS mils | TENSILES MD | TENSILES CD | ELONG. MD | ELONG. CD | AIR PERMEABILITY cfm |
|---|---|---|---|---|---|---|---|
| | | | lbs/in | | % | | |
| 5 (6 mil) | 43 | 6.0 | 8.4 | 5.1 | 28 | 40 | 217 |
| 6 (7 mil) | 44 | 6.9 | 9.1 | 5.4 | 28 | 42 | 204 |

TABLE IV

WETTABILITY BEFORE AND AFTER AGING

| | BEFORE | | | AFTER | | |
|---|---|---|---|---|---|---|
| SAMPLE | ABSORB % | WICKING cm/ 10 min | WET OUT sec | ABSORB % | WICKING cm/ 10 min | WET OUT sec | WT. LOSS % |
| 5 (6 mil) | 224 | 96 | I | 277 | 85 | I | 0.4 |
| 6 (7 mil) | 254 | 90 | I | 290 | 87 | 1 | 1.0 |

I - immediate

EXAMPLE 3

A wettable battery separator material was prepared from a mixture of a wettable fiber matrix and non-wettable binder fibers.

In Samples 7, 8 and 10 the wettable fiber matrix used is a bicomponent fiber comprised of a polypropylene sheath and a polypropylene core. Combinations of Melt Additive formulations 4 and 5 were incorporated into the polypropylene sheath with essentially none of the additives migrating to the fiber core. The bicomponent fibers are 1.5 denier×½ inch and are commercially available from Fiber Inovation Technologies, Johnson City, Tenn.

Specifically in Samples 7, 8 and 10, 20% of the melt additive (30% active material) was incorporated into the polypropylene sheath (6% active material). The proportion of sheath/core in the bicomponent fiber is 50/50, thus the amount of active material in the total fiber was 3%.

In Samples 9 and 11 the wettable fiber matrix used is a polypropylene staple fiber containing combinations of Melt Additive formulations 4 and 5. The polypropylene staple fibers are 1.8 denier×12 mm and are commercially available from American Extrusion.

Specifically in Samples 9 and 11, 20% of the melt additive (30% active material) was incorporated into the polypropylene staple fiber (6% active material).

The non-wettable binder fibers comprised a bicomponent fiber having a polyethylene sheath and a polypropylene core. The binder fibers are 2.0 denier×5 mm and are commercially available as Chisso fibers from Chisso, Japan.

In each sample 50% of the wettable fiber matrix was mixed with 50% of the non-wettable binder fibers. The fiber furnish mixture was dispersed and wet-laid to form the nonwoven substrates. The substrates were evaluated after calendering for absorbency, wicking and wet-out to KOH. The tests were also done after 7 days exposure to KOH at 70° F. The results are summarized in Table V below.

TABLE V

| SAMPLE | BASIS WT. gsy | THICK-NESS mils | ABSORB. % BEFORE/ AFTER | WICKING mm BEFORE/ AFTER | WET-OUT sec BEFORE/ AFTER | WT. LOSS % |
|---|---|---|---|---|---|---|
| 7 | 27.09 | 4.52 | 230.8/ 247.6 | 13 3 | 50.18/ 6 min 58 sec | 0.123 |
| 8 | 26.26 | 3.6 | 193.6/ 213.7 | 19 3 | 55/ 4 min 29 sec | 0.862 |
| 9 | 26.18 | 3.68 | 181.3/ 198.5 | 39 12 | immed/ 1 min 21 sec | 8.186 |
| 10 | 44.24 | 6.12 | 237.8/ 261.1 | 13 4 | 1 min 40 sec/ 8 min 4 sec | 0.333 |
| 11 | 43.78 | 6.42 | 261.4/ 277.4 | 64 19 | immed/ 2 min 32 sec | 1.043 |

EXAMPLE 4

A wettable battery separator material was prepared from a mixture of a wettable fiber matrix and non-wettable binder fibers.

In Samples 12, 13 and 14 the wettable fiber matrix used is a bicomponent fiber comprised of a polypropylene sheath and a polypropylene core. The proportion of sheath/core in the bicomponent fiber is 60/40. Combinations of Melt Additive formulations 4 and 5 were incorporated into the polypropylene sheath with essentially none of the additives migrating to the fiber core. The bicomponent fibers are 1.5 denier×½ inch and are commercially available from Fiber Inovations Technologies, Johnson City, Tenn. In particular the samples were as follows, Sample 12 the fiber sheaths are 77.5% 12 mfr polypropylene, 20% Melt Additive 4 and 2.5% Melt Additive 5. The fiber core is 18 mfr polyproylene.

Sample 13 the fiber sheaths are 73.5% 12 mfr polypropylene, 24% Melt Additive 4 and 2.5% Melt Additive 5. The fiber core is 18 mfr polyproylene.

Sample 14 the fiber sheaths are 71.5% 12 mfr polypropylene, 26% Melt Additive 4 and 2.5% Melt Additive 5. The fiber core is 18 mfr polyproylene.

In Samples 12, 13 and 14, 50% of the wettable fiber matrix were combined with 50% of non-wettable binder fibers comprised a bicomponent fiber having a polyethylene sheath and a polypropylene core. The binder fibers are 2.0 denier×5 mm and are commercially available as Chisso fibers from Chisso, Japan.

Sample 15 was prepared from a mixture of a wettable fiber matrix and a wettable binder fiber. The wettable fiber matrix used is a polypropylene staple fiber containing combinations of Melt Additive formulations 4 and 5. The polypropylene staple fibers are 1.8 denier×12 mm and are commercially available from American Extrusion. The wettable binder fiber is a bicomponent fiber wherein the fiber sheath is 77.5% low density polyethylene, 20% Melt Additive 4 and 2.5% Melt Additive 5. The fiber core is 18 mfr polypropylene. The binder bicomponent fibers are 1.5 denier×½ inch and are commercially available from Fiber Inovations Technologies, Johnson City, Tenn.

As a control, 50% of the non-wettable bicomponent binder fibers having a polyethylene sheath and a polypropylene core (Chisso fibers) were mixed with 50% of a polypropylene fiber matrix (American Extrusion fibers) without melt additives.

The fiber furnish mixtures in each sample was dispersed and wet-laid to form the nonwoven substrates. The handsheets were evaluated after calendering for absorbency, wicking and wet-out to KOH. The tests were also done after 5 days exposure to KOH at 70° F. The results are summarized in Table VI below.

TABLE VI

| SAMPLE | STRIP TENSILE lbs/1" | Initial WICK mm | Initial ABSORB. % | 5 days WICK mm | 5 days ADSORB. % |
|---|---|---|---|---|---|
| CONTROL | 3.58 | 70 | 257 | 75 | 237 |
| 12 | 4.06 | 84 | 338 | 82 | 370 |
| 13 | 4.07 | 73 | 283 | 80 | 308 |
| 14 | 3.95 | 72 | 305 | 91 | 357 |
| 15 | 1.43 | 68 | 302 | 78 | 378 |

As illustrated in Table VI the tensile and absorbency of the handsheet samples increased. The strength and wettability fo the nonwovens remained even after aging. These results indicate that the separate properties of tensile and absorbency can be provided in a nonwoven. In addition, nonwovens are produced that have both increased tensile and absorbency.

EXAMPLE 5

A wettable battery separator material was prepared from a mixture of a wettable fiber matrix, non-wettable binder fibers and wettable binder fibers.

In Samples 16 and 17 the wettable fiber matrix used is a bicomponent fiber comprised of a polypropylene sheath and a polypropylene core. The proportion of sheath/core in the bicomponent fiber is 60/40. Combinations of Melt Additive formulations 4 and 5 were incorporated into the polypropylene sheath with essentially none of the additives migrating to the fiber core. The bicomponent fibers are 1.8 denier×½ inch and are commercially available from Fiber Inovations Technologies, Johnson City, Tenn.

The non-wettable binder fibers are bicomponent fibers having a polyethylene sheath and a polypropylene core. The binder fibers are 2.0 denier×5 mm and are commercially available as Chisso fibers from Chisso, Japan.

The wettable binder fibers used are bicomponent fibers comprised of a polyethylene sheath and a polypropylene core.

Combinations of Melt Additive formulations 4 and 5 were incorporated into the polyethylene sheath with essentially none of the additives migrating to the fiber core. The bicomponent fibers are 1.6 denier×½ inch and are commercially available from Fiber Inovations Technologies, Johnson City, Tenn.

The fiber furnish in each of the samples are as follows.

| Sample 16 | 40% wettable fiber matrix; 40% non-wettable binder fiber; and 20% wettable binder fiber |
| --- | --- |
| Sample 17 | 30% wettable fiber matrix; 30% non-wettable binder fiber; and 40% wettable binder fiber |

The fiber furnish mixtures in each sample was dispersed and wet-laid to form the nonwoven substrates. The substrates were evaluated after calendering for absorbency, wicking and wet-out to KOH. The tests were also done after 7 days exposure to KOH at 70° F. The results are summarized in Tables VII and VIII below.

TABLE VII

| SAMPLE | BASIS WT. gsm | MD TENSILE kg/50 mm | CD TENSILE kg/50 mm | AIR PERMEABILITY cfm | AIR PERMEABILITY cm3/cm3/s |
| --- | --- | --- | --- | --- | --- |
| 16 | 59.4 | 11.2 | 6.3 | 84.2 | 42.4 |
| 17 | 57.4 | 9.7 | 5.6 | 134.8 | 68.9 |

TABLE VIII

WETTABILITY BEFORE AND AFTER AGING

| SAMPLE | ABSORB % | WICKING mm | ABSORB % | WICKING mm | ALKALI PROOF % loss |
| --- | --- | --- | --- | --- | --- |
| 16 | 226.8 | 85.3 | 237.9 | 93 | 0.67 |
| 17 | 297.2 | 79.3 | 333.9 | 100.7 | 0.5 |

It is known that current nylon based battery separators degrade in the presence of the potassium hydroxide electrolyte. The nonwoven mats of the invention present a replacement for the nylon based battery separators by providing separator materials that have been made permanently wettable, or if desired only partially wettable. Polypropylene is naturally hydrophobic. Known methods to make polypropylene wettable involves surface grafting of acrylic acid by ultraviolet radiation or by other surface modification methods such as plasma which are slow and expensive.

For fibrous battery separator applications the polypropylene needs to be resistant to the KOH and exhibit permanent wettability throughout the life of the product. Wettability is quantified by contact angle measurements in the case of a film and additionally by the rate of wicking and % absorbency in the case of a fibrous web used as the battery separator.

The process of the present invention provides advantages over prior practice by providing a nonwoven having both hydrophilic and hydrophobic regions as opposed to hydrophilic topical treatments. Additional wettability is achieved with incorporation of the surfactant that has more resistance to KOH solution than surfactants used in the prior art. Increased wettability is achieved simultaneously with an increase in strength. The wettability claimed in the invention is permanent and durable in a KOH solution as opposed to the prior art.

Finally, variations from the examples given herein are possible in view of the above disclosure. Therefore, although the invention has been described with reference to certain preferred embodiments, it will be appreciated that other processes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. A nonwoven mat made by a process comprising the following steps:

creating a fiber furnish comprising a wettable fiber matrix; wherein said wettable fiber matrix are thermoplastic polymeric fibers blended with at least one hydrophilic melt additive, said hydrophilic melt additive comprising a mixture of hydroxy phenols and polyethylene glycols;

meltblowing, spunbonding or wet-laying said fiber furnish to form the nonwoven mat.

2. The nonwoven mat according to claim 1 wherein said fiber furnish further comprises non-wettable binder fibers.

3. The nonwoven mat according to claim 1 wherein said wettable thermoplastic polymeric fibers are selected from the group consisting of polypropylene stable fibers and polypropylene/polypropylene bicomponent fibers having a polypropylene sheath and a polypropylene core blended with a hydrophilic melt additive.

4. The nonwoven mat according to claim 2 wherein said non-wettable binder fibers are polyethylene/polypropylene bicomponent fibers comprising a polyethylene sheath and a polypropylene core.

5. The nonwoven mat according to claim 1, wherein said fiber furnish further comprises wettable binder fibers.

6. The nonwoven mat according to claim 5, wherein said wettable binder fibers are polyethylene/polypropylene bicomponent fibers blended with at least one hydrophilic melt additive.

7. The nonwoven mat according to claim 1, comprising the further steps of:
 laying said fiber furnish on a papermaking machine to form a wet-laid web;
 removing water from said wet-laid web; and
 thermal bonding and calendering said wet-laid web to form the nonwoven mat.

8. The nonwoven mat according to claim 1, wherein the mat has hydrophilic and hydrophobic regions and has enhanced wettability and increased strength.

9. A nonwoven web of a wettable fiber matrix wherein said wettable fiber matrix are thermoplastic polymeric fibers blended with at least one hydrophilic melt additive, said hydrophilic melt additive comprising a mixture of hydroxy phenols and polyethylene glycols.

10. The nonwoven web according to claim 9, further comprising non-wettable binder fibers.

11. The nonwoven web according to claim 9 wherein said thermoplastic polymeric fibers are polypropylene staple fibers.

12. The nonwoven web according to claim 9 wherein said thermoplastic polymeric fibers are polypropylene/polypropylene bicomponent fibers.

13. The nonwoven web according to claim 12 wherein said polypropylene/polypropylene bicomponent fibers comprise a polypropylene sheath and a polypropylene core.

14. The nonwoven web according to claim 10 wherein said non-wettable binder fibers are polyethylene/polypropylene bicomponent fibers.

15. The nonwoven web according to claim 14 wherein said polyethylene/polypropylene bicomponent fibers comprise a polyethylene sheath and a polypropylene core.

16. The nonwoven web according to claim 9, wherein said nonwoven web further comprises wettable binder fibers.

17. The nonwoven web according to claim 16 wherein said wettable binder fibers are polyethylene/polypropylene bicomponent fibers blended with a hydrophilic melt additive.

18. The nonwoven web according to claim 10 wherein said nonwoven web is:
 30–90 wt. % of said wettable fiber matrix; and
 10–70 wt. % of said non-wettable binder fibers.

19. The nonwoven web according to claim 9 wherein said nonwoven web has hydrophobic and hydrophilic regions.

20. The nonwoven web according to claim 9 wherein said nonwoven web has enhanced wettability and increased strength.

21. The nonwoven web according to claim 10, wherein said nonwoven web further comprises wettable binder fibers.

22. The nonwoven web according to claim 21 wherein said wettable binder fibers are polyethylene/polypropylene bicomponent fibers blended with a hydrophilic melt additive.

23. The nonwoven web according to claim 21 wherein said nonwoven web is:
 up to 40 wt. % of said wettable fiber matrix;
 up to 40 wt. % of said non-wettable binder fibers; and
 up to 30 wt. % of said wettable binder fibers.

24. The nonwoven web according to claim 10 wherein said nonwoven web has enhanced wettability and increased strength.

25. A nonwoven web according to claim 9, wherein at least some of said thermoplastic polymeric fibers are sheath/core fibers and said hydrophilic melt additive is blended into the sheath of said sheath/core fibers.

* * * * *